(12) United States Patent
Shin et al.

(10) Patent No.: US 8,790,207 B2
(45) Date of Patent: Jul. 29, 2014

(54) HYDRAULIC CONTROL SYSTEM OF AUTOMATIC TRANSMISSION FOR HYBRID VEHICLE

(75) Inventors: Gwang Seob Shin, Ansan-si (KR); Jong Hyun Kim, Suwon-si (KR); Youngchul Kim, Gwangmyeong-si (KR); Jang Mi Lee, Tongyeong-si (KR); Yeonho Kim, Suwon (KR); Jaeshin Yi, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 452 days.

(21) Appl. No.: 13/172,789

(22) Filed: Jun. 29, 2011

(65) Prior Publication Data

US 2012/0090950 A1   Apr. 19, 2012

(30) Foreign Application Priority Data

Oct. 14, 2010   (KR) .......................... 10-2010-0100448

(51) Int. Cl.
*F16H 31/00* (2006.01)
(52) U.S. Cl.
USPC ............................ 475/119; 475/116; 477/906
(58) Field of Classification Search
USPC .............................................. 475/116, 119, 5
See application file for complete search history.

(56) References Cited

U.S. PATENT DOCUMENTS

| | | | | | |
|---|---|---|---|---|---|
| 5,624,341 | A | * | 4/1997 | Park .............................. | 475/119 |
| 7,854,676 | B2 | * | 12/2010 | Park .............................. | 475/120 |
| 8,403,787 | B2 | * | 3/2013 | Kim et al. ........................ | 475/5 |
| 2002/0061803 | A1 | * | 5/2002 | Aoki .................................. | 477/3 |
| 2011/0136608 | A1 | * | 6/2011 | Kim et al. ..................... | 475/127 |
| 2012/0090950 | A1 | * | 4/2012 | Shin et al. ................... | 192/12 C |

FOREIGN PATENT DOCUMENTS

JP        2004-176805 A    6/2004

* cited by examiner

*Primary Examiner* — Derek D Knight
(74) *Attorney, Agent, or Firm* — Morgan, Lewis & Bockius LLP

(57) ABSTRACT

A hydraulic control system of an automatic transmission for a hybrid vehicle provides for simplifying structure of a valve body and improving responsiveness as a consequence of directly controlling hydraulic pressure supplied to friction elements. The hydraulic control system may operate first and second clutches and first and second brakes selectively according to each driving mode, and may include: a first proportional control solenoid valve for selectively supplying forward pressure and reverse pressure supplied from a manual valve to the first clutch; a second proportional control solenoid valve for selectively supplying line pressure supplied from a primary regulator valve to the second clutch; a third proportional control solenoid valve for selectively supplying the line pressure supplied from the primary regulator valve to the first brake; and a fourth proportional control solenoid valve for selectively supplying the forward pressure supplied from the manual valve to the second brake.

14 Claims, 6 Drawing Sheets

FIG.2

|  | | C1 | C2 | B1 | B2 |
|---|---|---|---|---|---|
| N, P (on driving) | | | | | |
| N, P (on stopping) | | | | ○ | |
| POWER SPLIT | EV1, REV1 | ○ | | | |
| | EV2, REV2 | | | ○ | |
| | INPUT SPLIT | ○ | | ○ | |
| | COMPOUND SPLIT | | | | |
| FIXED GEAR | 1st (UD) | ○ | ○ | ○ | |
| | 2nd (1:1) | ○ | ○ | | |
| | 3rd (OD) | | | | ○ |

FIG.4

| operating condition | | operation |
|---|---|---|
| SS-A | C1 | B1 |
| × | × | ○ |
| × | ● | × |
| ● | × | ○ |
| ● | ● | ○ |

FIG.5

| operating condition | | operation |
|---|---|---|
| C1 | C2 | B1 |
| × | × | ○ |
| × | ● | ○ |
| ● | × | ○ |
| ● | ● | × |

FIG.6

| operating condition || operation |
|---|---|---|
| B1 | C2 | B2 |
| × | × | ○ |
| × | ● | × |
| ● | × | × |
| ● | ● | × |

FIG.7

|  |  | VFS1 | VFS2 | VFS3 | VFS4 | SS-A |
|---|---|---|---|---|---|---|
| N, P (on driving) | | ○ | | | | |
| N, P (on stopping) | | ○ | ○ | | | |
| POWER SPLIT | EV1, REV1 | ○ | ○ | ○ | | |
| | EV2, REV2 | | ○ | ○ | | |
| | INPUT SPLIT | ○ | ○ | ○ | | |
| | COMPOUND SPLIT | | ○ | ○ | | |
| FIXED GEAR | 1st (UD) | ○ | | ○ | | |
| | 2nd (1:1) | | | | | ○ |
| | 3rd (OD) | | ○ | | ○ | |

HYDRAULIC CONTROL SYSTEM OF AUTOMATIC TRANSMISSION FOR HYBRID VEHICLE

CROSS-REFERENCE TO RELATED APPLICATION

This application claims priority to and the benefit of Korean Patent Application No. 10-2010-0100448 filed in the Korean Intellectual Property Office on Oct. 14, 2010, the entire contents of which are incorporated herein by reference.

BACKGROUND OF INVENTION

1. Field of Invention

The present invention relates to a hydraulic control system of an automatic transmission for a hybrid vehicle. More particularly, the present invention relates to a hydraulic control system of an automatic transmission for a hybrid vehicle which simplifies structure of a valve body and improves responsiveness by directly controlling hydraulic pressure supplied to friction elements.

2. Description of Related Art

Generally, a hybrid vehicle is a vehicle generates driving torque by efficiently combining two or more different types of power sources. Most hybrid vehicles are provided with an engine generating power by using fuel and an electric motor generating power by electricity.

Cases which greatly enhance fuel economy of a hybrid vehicle are: (1) assisting power of the engine by using the electric motor when the vehicle accelerates or (2) performing optimal driving through automatic shift control. Therefore, the hybrid vehicle can obtain excellent fuel economy compared with a conventional vehicle provided with a gasoline engine and an automatic transmission.

According to such a hybrid vehicle, an engine clutch is disposed at an output of the engine and an automatic transmission including the electric motor is disposed at the rear of the engine clutch. As a result, driving wheels are driven by the power output from the automatic transmission.

In addition, a motor control unit controls electricity of battery supplied to the electric motor, and a hybrid control unit controlling the hybrid vehicle totally is electrically connected to an engine control unit, a transmission control unit, a battery management system, and other devices which a driver directly manipulates so as to receive a current driving condition of the vehicle and controls the motor control unit based thereon.

When initial running, the hybrid vehicle runs at electric vehicle EV mode by torque of the electric motor. After that, if the engine clutch is engaged, the hybrid vehicle runs at HEV mode (motor+engine).

The automatic transmission applied such a hybrid vehicle includes a gear train which is a shift mechanism and a hydraulic control system for selectively operating at least one operating element among operating elements of the gear train according to the driving condition of the vehicle.

In addition, the gear train includes one or more planetary gear sets, and a plurality of friction elements applied to the gear train is selectively operated by hydraulic pressure supplied by the hydraulic control system.

According to a conventional hydraulic control system of an automatic transmission for a hybrid vehicle, hydraulic pressure supplied from a hydraulic pump is indirectly controlled and is supplied to each friction element. Since a pressure control valve including a spool valve is applied to each solenoid valve, hydraulic lines of a valve body are complex and a large number of components are used. Therefore, manufacturing cost may be increased.

Since reducing pressure should be generated so as to control the pressure control valve, control region may be restricted and responsiveness may be slow.

The above information disclosed in this Background section is only for enhancement of understanding of the background of the invention and therefore it may contain information that does not form the prior art that is already known in this country to a person of ordinary skill in the art.

SUMMARY OF INVENTION

The present invention has been made in an effort to provide a hydraulic control system of an automatic transmission for a hybrid vehicle having advantages of simplifying structure of a valve body and improving responsiveness as a consequence of directly controlling hydraulic pressure supplied to friction elements.

A hydraulic control system of an automatic transmission for a hybrid vehicle according to an exemplary embodiment of the present invention may operate first and second clutches and first and second brakes selectively according to each driving mode, and may include a first proportional control solenoid valve for selectively supplying forward pressure and reverse pressure supplied from a manual valve to the first clutch, a second proportional control solenoid valve for selectively supplying line pressure supplied from a primary regulator valve to the second clutch, a third proportional control solenoid valve for selectively supplying the line pressure supplied from the primary regulator valve to the first brake, and a fourth proportional control solenoid valve for selectively supplying the forward pressure supplied from the manual valve to the second brake.

A reverse pressure control valve for supplying the forward pressure or the reverse pressure to the first proportional control solenoid valve may be disposed between the manual valve and the first proportional control solenoid valve.

The reverse pressure control valve may have a first port connected to a forward pressure line of the manual valve, a second port connected to a reverse pressure line of the manual valve, a third port supplying hydraulic pressure supplied to the first port to the first proportional control solenoid valve, and a fourth port supplying hydraulic pressure supplied to the second port to the first proportional control solenoid valve.

Fail-safe assembly comprising at least one of first, second, and third fail-safe valves may be disposed between the third and fourth proportional control solenoid valves and the first and second brakes.

The first fail-safe valve may be controlled by an on/off solenoid valve, wherein a first clutch is released so as to prevent engine lock in a mode where the on/off solenoid valve is turned off and the first brake is operated, and the first brake and the first clutch are simultaneously operated in a case that the on/off solenoid valve is turned on.

The first fail-safe valve may be controlled by the first clutch, the on/off solenoid valve, and the line pressure so as to control hydraulic pressure supplied from the third proportional control solenoid valve to the first brake.

The first fail-safe valve may have a first port receiving hydraulic pressure from the third proportional control solenoid valve, a second port selectively supplying the hydraulic pressure received from the first port to the second fail-safe valve, a third port formed at one side portion thereof and receiving control pressure of the on/off solenoid valve, a fourth port formed at an opposite side of the third port and receiving operation pressure of the first clutch as control pressure thereof, and a fifth port receiving the line pressure.

The second fail-safe valve is configured to prevent operation of the first brake in a case that the first and second clutches are simultaneously operated.

The second fail-safe valve may be controlled by operation pressure of the first and second clutches and the line pressure so as to control hydraulic pressure supplied from the first fail-safe valve to the first brake.

The second fail-safe valve may have a first port connected to the second port of the first fail-safe valve, a second port supplying hydraulic pressure of the first port to the first brake, a third port receiving the operation pressure of the first clutch as control pressure thereof, a fourth port receiving the operation pressure of the second clutch as control pressure thereof, and a fifth port formed at an opposite side of the third and fourth ports and receiving the line pressure as control pressure thereof.

The third fail-safe valve may be configured to prevent operation of the second brake in a case that the first brake or the first clutch is operated.

The third fail-safe valve may be controlled by operation pressure of the first brake and the second clutch and the forward pressure so as to control hydraulic pressure supplied from the fourth proportional control solenoid valve to the second brake.

The third fail-safe valve may have a first port connected to the fourth proportional control solenoid valve, a second port supplying hydraulic pressure of the first port to the second brake, a third port receiving the operation pressure of the second clutch as control pressure thereof, a fourth port receiving the operation pressure of the first brake as control pressure thereof, and a fifth port formed at an opposite side of the third and fourth ports and receiving the forward pressure as control pressure thereof.

Bypass lines provided with a check valve may be formed respectively at lines downstream of the first, second, third, and fourth proportional control solenoid valves.

The first and second proportional control solenoid valves may be normal open types, and the third and fourth proportional control solenoid valves may be normal cross types.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an exemplary operation chart of friction elements at each shift speed applied in accordance with the present invention.

FIG. 4 illustrates operation of the first fail-safe valve of FIG. 3.

FIG. 5 illustrates operation of the second fail-safe valve of FIG. 3.

FIG. 6 illustrates operation of the third fail-safe valve of FIG. 3.

FIG. 7 is an exemplary operation chart of solenoid valves at each shift speed according to the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
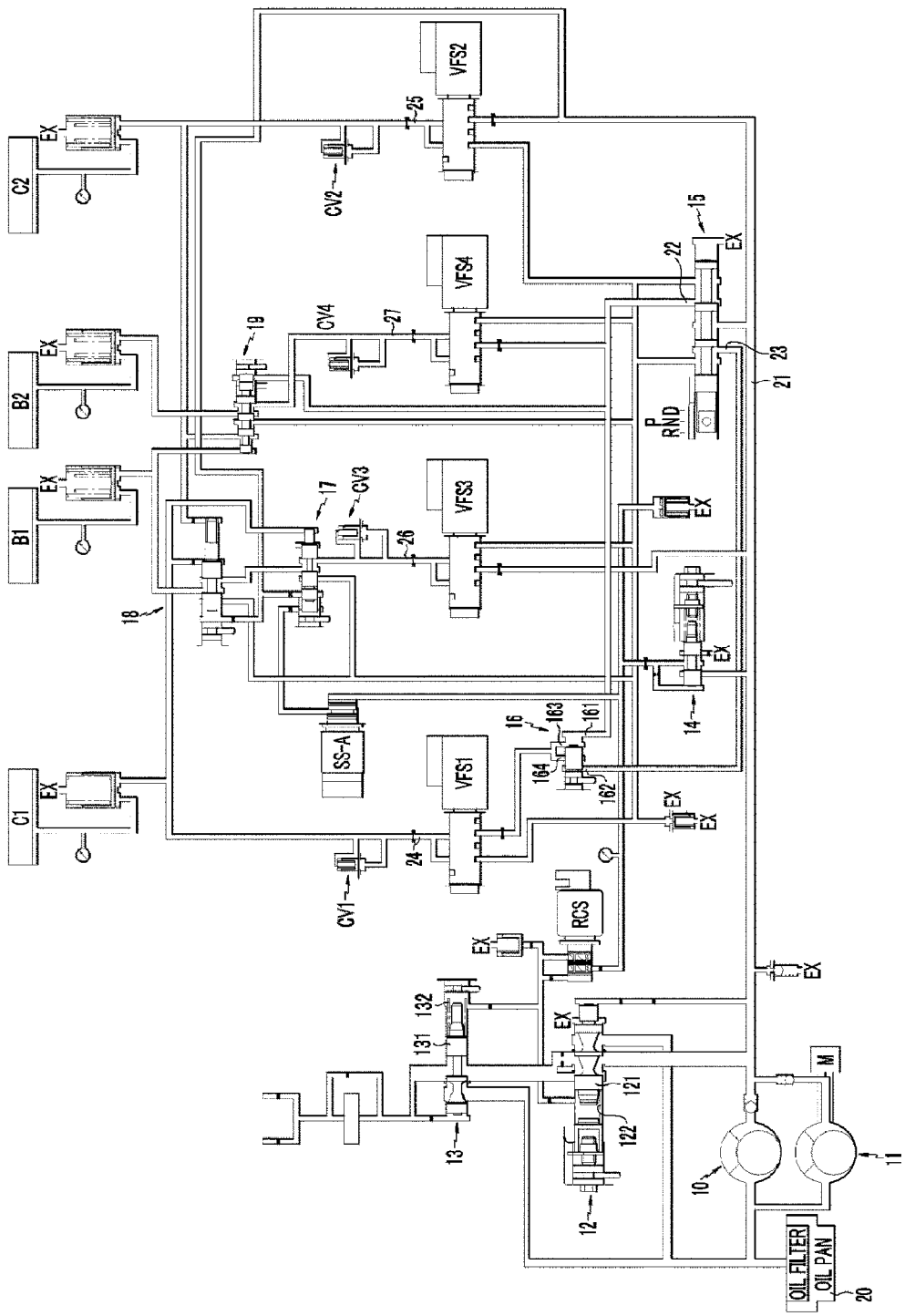
FIG. 1 is a schematic diagram of an exemplary hydraulic control system of the present invention.

FIG. 1 is a schematic diagram of a hydraulic control system according to various embodiments of the present invention. A hydraulic control system according to various embodiments of the present invention can realize two power split modes (input split/compound split) and three fixed gear modes (underdrive (UD)/same speed/overdrive (OD)) by using two clutches C1 and C2 and two brakes B1 and B2 (referring to FIG. 2).

The hydraulic control system according to various embodiments of the present invention includes two hydraulic pumps 10 and 11 or other suitable oil supply means, two regulator valves 12 and 13 or other suitable line pressure control means, a reducing valve 14 reducing line pressure, a manual valve 15 selecting shift range, a line pressure control solenoid valve RCS receiving control pressure from the reducing valve 14, an on/off solenoid valve SS-A, first, second, third, and fourth proportional control solenoid valves VFS1, VFS2, VFS3, and VFS4 controlling operation pressure supplied to four friction elements C1, C2, B1, and B2, a reverse control valve 16 converting hydraulic lines of forward pressure and reverse pressure supplied from the manual valve 14, and first, second, and third fail-safe valves 17, 18, and 19 or other suitable fail-safe assembly.

Two hydraulic pumps 10 and 11, or other suitable oil supply means, include a main hydraulic pump 10 and a sub hydraulic pump 11. The main hydraulic pump 10 is driven by an engine, and the sub hydraulic pump 11 is driven by an additional drive motor. Therefore, oil stored in an oil fan 20 is pumped by at least one of the two hydraulic pumps 10 and 11.

In addition, hydraulic pressure generated by the main and sub hydraulic pumps 10 and 11 is supplied to a primary regulator valve 12, a secondary regulator valve 13, and a line pressure control solenoid valve RCS which controls the regulator valves 12 and 13.

Accordingly, the hydraulic pressure is controlled to predetermined line pressure by the line pressure control solenoid valve RCS and elastic members 122 and 132 elastically supporting spools 121 and 131 in the regulator valves 12 and 13, and the line pressure is changed according to a driving condition so as to improve fuel consumption.

The reducing valve 14 is a valve which reduces hydraulic pressure, and the line pressure is reduced by an elastic member 142 elastically supporting a spool 141 in the reducing valve 14 to a predetermined direction. The hydraulic pressure reduced by the reducing valve 14 is supplied to the line pressure control solenoid valve RCS and the on/off solenoid valve SS-A as control pressure thereof.

The manual valve 15 changes hydraulic lines according to manual shifting of a driver, and is connected to a line pressure line 21, a forward pressure line 22, and a reverse pressure line 23.

Therefore, the manual valve 15 supplies the hydraulic pressure supplied through the line pressure line 21 to the forward pressure line 22 or the reverse pressure line 23 according to a selected range.

The first proportional control solenoid valve VFS1 controlling operation pressure of the first clutch C1 and the fourth proportional control solenoid valve VFS4 controlling operation pressure of the second brake B2 are connected to the forward pressure line 22 of the manual valve 15 so as to control forward pressure supplied from the manual valve 15 and to supply it to the first clutch C1 and the second brake B2 when forward driving.

The third proportional control solenoid valve VFS3 controlling operation pressure of the first brake B1 and the second proportional control solenoid valve VFS2 controlling operation pressure of the second clutch C2 are directly connected to the line pressure line 21 so as to supply the line pressure to the second clutch C2 and the first brake B1.

The reason why the line pressure is configured to be directly supplied to the second and third proportional control solenoid valves VFS2 and VFS3 is that the engine can be started and charging mode can be realized.

The first and second proportional control solenoid valves VFS1 and VFS2 are normal open types which supply hydraulic pressure when electricity is not applied to them, and the third and fourth proportional control solenoid valves VFS3 and VFS4 are normal cross types which supply hydraulic pressure when electricity is applied to them.

In addition, bypass lines provided with check valves CV1, CV2, CV3, and CV4 are formed respectively at lines 24, 25, 26, and 27 downstream of the first, second, third, and fourth proportional control solenoid valves VFS1, VFS2, VFS3, and VFS4 so as to supply hydraulic pressure stably.

The reverse pressure control valve 16 is a shuttle valve, and has a first port 161 connected to the forward pressure line 22, a second port 162 connected to the reverse pressure line 23, a third port 163 supplying hydraulic pressure supplied to the first port 161 to the first proportional control solenoid valve VFS1, and a fourth port 164 supplying hydraulic pressure supplied to the second port 162 to the first proportional control solenoid valve VFS1.

When the forward pressure is supplied to the reverse pressure control valve 16, the first and third ports 161 and 163 are communicated with each other and the forward pressure is supplied to the first proportional control solenoid valve VFS1. When the reverse pressure, on the contrary, is supplied to the reverse pressure control valve 16, the second and fourth ports 162 and 164 are communicated with each other and the reverse pressure is supplied to the first proportional control solenoid valve VFS1.

That is, the reverse pressure control valve 16 controls the first clutch C1 when the vehicle reverses so as to improve reverse hill-climbing ability.

More concretely, a first reverse speed REV1 is achieved by operating the first brake B1, and a second reverse speed REV2 is achieved by controlling the first clutch C1 and the first brake B1.

In addition, the first, second, and third fail-safe valves 17, 18, and 19 for performing fail-safe function are disposed between the third and fourth proportional control solenoid valves VFS3 and VFS4 and the first and second brakes B1 and B2.

The first fail-safe valve 17 is controlled by the first clutch C1, the on/off solenoid valve SS-A, and the line pressure so as to control the hydraulic pressure supplied from the third proportional control solenoid valve VFS3 to the first brake B1. The second fail-safe valve 18 is controlled by operation pressure of the first and second clutches C1 and C2 and the line pressure so as to control the hydraulic pressure supplied from the first fail-safe valve 17 to the first brake B1, and the third fail-safe valve 19 is controlled by operation pressure of the first brake Bi and the second clutch C2 and the forward pressure so as to control the hydraulic pressure supplied from the fourth proportional control solenoid valve VFS4 to the second brake B2.

Figure 3:
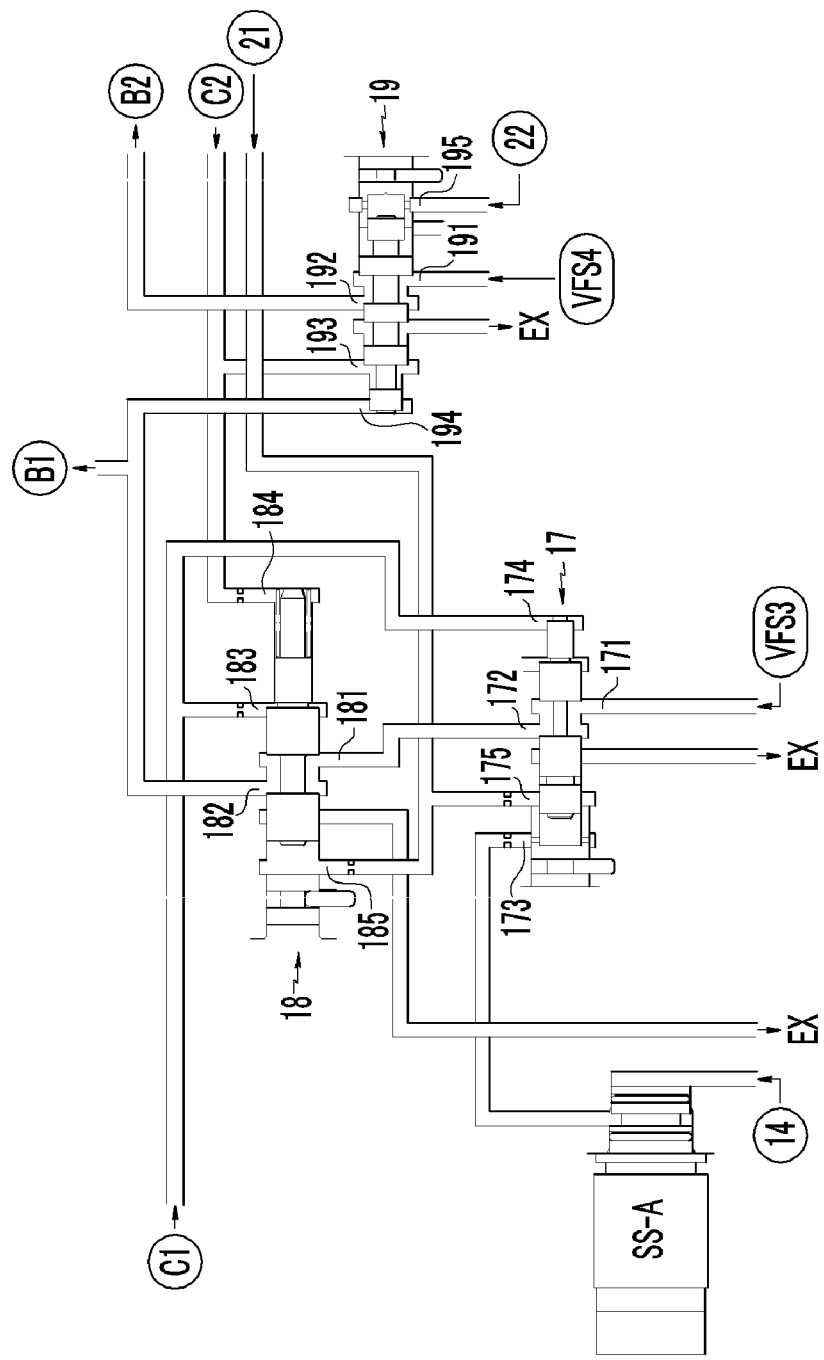
FIG. 3 is an enlarged view of exemplary first, second, and third fail-safe valves in accordance with the present invention.

For above-mentioned operation, the first fail-safe valve 17, as shown in FIG. 3, has a first port 171 receiving the hydraulic pressure from the third proportional control solenoid valve VFS3, a second port 172 selectively supplying the hydraulic pressure supplied to the first port 171 to the second fail-safe valve 18, a third port 173 formed at one side portion of the first fail-safe valve 17 and receiving the control pressure of the on/off solenoid valve SS-A, a fourth port 174 formed at an opposite side of the third port 173 and receiving the operation pressure of the first clutch C1 as a control pressure thereof, and a fifth port 175 receiving the line pressure.

The first and second ports 171 and 172 are connected if the control pressure is supplied to the third port 173, the first and second ports 171 and 172 are not connected if the hydraulic pressure is supplied to the fourth port 174, the first and second ports 171 and 172 are connected by acting area of the hydraulic pressure if the control pressure is simultaneously supplied to the third and fourth ports 173 and 174.

That is, as shown in FIG. 4, the first clutch C1 is released so as to prevent engine lock when the on/off solenoid valve SS-A is turned off and the first brake B1 is operated, and the first brake B1 and the first clutch C1 are simultaneously operated so as to achieve EV2 mode when the on/off solenoid valve SS-A is turned on. Therefore, applicability to plug-in hybrid vehicle can be secured.

The second fail-safe valve 18, as shown in FIG. 3, has a first port 181 connected to the second port 172 of the first fail-safe valve 17, a second port 182 supplying the hydraulic pressure supplied to the first port 171 to the first brake B1, a third port 183 receiving the operation pressure of the first clutch C1 as control pressure thereof, a fourth port 184 receiving the operation pressure of the second clutch C2 as control pressure thereof, and a fifth port 185 formed at an opposite side of the third and fourth ports 183 and 184 and receiving the line pressure as control pressure thereof.

If the first and second clutches C1 and C2 are simultaneously operated and control pressure is supplied to the third and fourth ports 183 and 184, the first and second ports 181 and 182 are not connected and the hydraulic pressure supplied to the first brake B1 is blocked so as to prevent interlock.

That is, as shown in FIG. 5, operation of the first brake B1 is prevented when the first and second clutches C1 and C2 are simultaneously operated.

The third fail-safe valve 19, as shown in FIG. 3, has a first port 191 connected to the fourth proportional control solenoid valve VFS4, a second port 192 supplying the hydraulic pressure supplied to the first port 191 to the second brake B2, a third port 193 receiving the operation pressure of the second clutch C2 as control pressure thereof, a fourth port 194 receiving the operation pressure of the first brake B1 as control pressure thereof, and a fifth port 195 formed at an opposite side of the third and fourth ports 193 and 194 and receiving the forward pressure as control pressure thereof.

When the operation pressure of the second clutch C2 or the operation pressure of the first brake B1 is supplied to the third port 193 or the fourth port 194, the first and second ports 191 and 192 are not connected and the hydraulic pressure supplied to the second brake B2 is blocked so as to prevent interlock.

Figure 6:
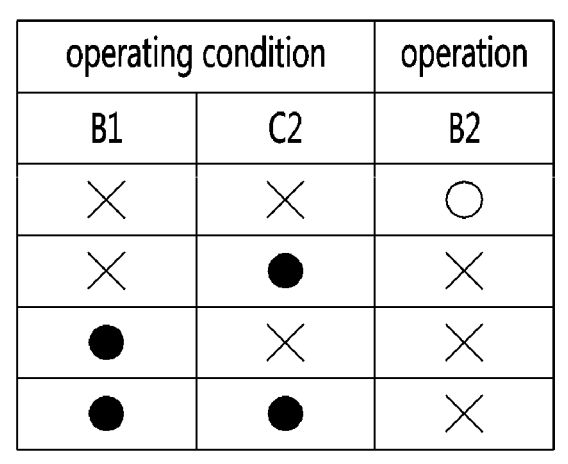

That is, if the first brake B1 or the first clutch C1 is operated, operation of the second brake B2 is prevented as shown in FIG. 6.

The hydraulic control system according to various embodiments of the present invention, as shown in FIG. 7, controls hydraulic lines when electricity is applied to each solenoid valve. In FIG. 7, "o" represents application of electricity to the solenoid valve.

At N, P ranges on driving, electricity is applied to the first and second proportional control solenoid valves VFS1 and VFS2 so as to prevent supply of the hydraulic pressure to the first and second clutches C1 and C2. At N, P ranges on stopping, electricity is applied to the first, second, and third proportional control solenoid valves VFS1, VFS2, and VFS3 so as to prevent the supply of the hydraulic pressure to the first and second clutches C1 and C2 and to supply the hydraulic pressure to the first brake B1.

In addition, various embodiments of the present invention provides two reverse shift speeds. At the first reverse speed REV1, electricity is applied to the first, second, and third proportional control solenoid valves VFS1, VFS2, and VFS3 so as to prevent the supply of the hydraulic pressure to the first and second clutches C1 and C2 and to supply the hydraulic pressure to the first brake B1.

At the second reverse speed REV2, supply of electricity to the first proportional control solenoid valve VFS1 to which the electricity was supplied at the first reverse speed REV1 is blocked and electricity is supplied to the on/off solenoid valve SS-A so as to supply the hydraulic pressure to the first clutch C1 and the first brake B1.

At input split mode among power split mode, electricity is applied to the first, second, and third proportional control solenoid valves VFS1, VFS2, and VFS3 so as to block supply of the hydraulic pressure to the first and second clutches C1 and C2 and to supply the hydraulic pressure to the first brake B1.

At compound split mode among power split mode, electricity is applied to the second proportional control solenoid valve VFS2 so as to prevent supply of the hydraulic pressure to the second clutch C2 and to supply the hydraulic pressure to the first clutch C1.

In addition, first, second, and third forward speeds are provided at fixed gear mode. At the first forward speed, electricity is applied to the first and third proportional control solenoid valves VFS1 and VFS3 so as to operate the second clutch C2 and the first brake B1. At the second forward speed, electricity is applied to the first and third proportional control solenoid valves VFS1 and VFS3 so as to operate the first and second clutches C1 and C2. At the third forward speed, electricity is applied to the second and fourth proportional control solenoid valves VFS2 and VFS4 so as to operate the first clutch C1 and the second brake B2.

In the description of shifting processes, operating control of the friction elements C1, C2, B1, and B2 is only explained, but shifting does not occur only by operating control of the friction elements C1, C2, B1, and B2. That is, in order to realize the shifting, the hybrid control unit may totally control two motors provide in the gear train including the planetary gear set according to driving condition of the vehicle besides the operation of the friction elements C1, C2, B1, and B2. These processes are well known to a person of an ordinary skill in the art, and detailed description thereof will be omitted.

Since hydraulic pressure supplied to friction elements is directly controlled by proportional control solenoid valves which are independently disposed, responsiveness may be improved according to various embodiments of the present invention.

Since pressure control valves which were applied to each proportional control solenoid valve is removed, the number of components may be reduced and hydraulic lines may be simplified. Therefore, structure of a valve body may be simplified.

For convenience in explanation and accurate definition in the appended claims, the terms "rear" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hydraulic control system of an automatic transmission for a hybrid vehicle which selectively operates first and second clutches and first and second brakes according to a plurality of driving modes, the hydraulic control system comprising:
   a first proportional control solenoid valve for selectively supplying a forward pressure and a reverse pressure supplied from a manual valve to the first clutch;
   a second proportional control solenoid valve for selectively supplying a line pressure supplied from a primary regulator valve to the second clutch;
   a third proportional control solenoid valve for selectively supplying the line pressure supplied from the primary regulator valve to the first brake; and
   a fourth proportional control solenoid valve for selectively supplying the forward pressure supplied from the manual valve to the second brake;
   wherein a fail-safe assembly comprising at least one of first, second, and third fail-safe valves are connected between the third and fourth proportional control solenoid valves and the first and second brakes.

2. The hydraulic control system of claim 1, wherein a reverse pressure control valve for supplying the forward pressure or the reverse pressure to the first proportional control solenoid valve is disposed between the manual valve and the first proportional control solenoid valve.

3. The hydraulic control system of claim 2, wherein the reverse pressure control valve has a first port connected to a forward pressure line of the manual valve, a second port connected to a reverse pressure line of the manual valve, a third port supplying hydraulic pressure supplied to the first port to the first proportional control solenoid valve, and a fourth port supplying hydraulic pressure supplied to the second port to the first proportional control solenoid valve.

4. The hydraulic control system of claim 1, wherein the first fail-safe valve is controlled by an on/off solenoid valve, and wherein a first clutch is released so as to prevent engine lock in a mode where the on/off solenoid valve is turned off and the first brake is operated, and the first brake and the first clutch are simultaneously operated in a case that the on/off solenoid valve is turned on.

5. The hydraulic control system of claim 4, wherein the first fail-safe valve is controlled by the first clutch, the on/off solenoid valve, and the line pressure so as to control hydraulic pressure supplied from the third proportional control solenoid valve to the first brake.

6. The hydraulic control system of claim 5, wherein the first fail-safe valve has a first port receiving hydraulic pressure from the third proportional control solenoid valve, a second port selectively supplying the hydraulic pressure received from the first port to the second fail-safe valve, a third port formed at one side portion thereof and receiving control pressure of the on/off solenoid valve, a fourth port formed at an opposite side of the third port and receiving operation pressure of the first clutch as control pressure thereof, and a fifth port receiving the line pressure.

7. The hydraulic control system of claim 1, wherein the second fail-safe valve is configured to prevent operation of the first brake in a case that the first and second clutches are simultaneously operated.

8. The hydraulic control system of claim 7, wherein the second fail-safe valve is controlled by operation pressure of the first and second clutches and the line pressure so as to control hydraulic pressure supplied from the first fail-safe valve to the first brake.

9. The hydraulic control system of claim 8, wherein the second fail-safe valve has a first port connected to the second port of the first fail-safe valve, a second port supplying hydraulic pressure of the first port to the first brake, a third port receiving the operation pressure of the first clutch as control pressure thereof, a fourth port receiving the operation pressure of the second clutch as control pressure thereof, and a fifth port formed at an opposite side of the third and fourth ports and receiving the line pressure as control pressure thereof.

10. The hydraulic control system of claim 1, wherein the third fail-safe valve is configured to prevent operation of the second brake in a case that the first brake or the first clutch is operated.

11. The hydraulic control system of claim 10, wherein the third fail-safe valve is controlled by operation pressure of the first brake and the second clutch and the forward pressure so as to control hydraulic pressure supplied from the fourth proportional control solenoid valve to the second brake.

12. The hydraulic control system of claim 11, wherein the third fail-safe valve has a first port connected to the fourth proportional control solenoid valve, a second port supplying hydraulic pressure of the first port to the second brake, a third port receiving the operation pressure of the second clutch as control pressure thereof, a fourth port receiving the operation pressure of the first brake as control pressure thereof, and a fifth port formed at an opposite side of the third and fourth ports and receiving the forward pressure as control pressure thereof.

13. A hydraulic control system of an automatic transmission for a hybrid vehicle which selectively operates first and second clutches and first and second brakes according to a plurality of driving modes, the hydraulic control system comprising:
a first proportional control solenoid valve for selectively supplying a forward pressure and a reverse pressure supplied from a manual valve to the first clutch;
a second proportional control solenoid valve for selectively supplying a line pressure supplied from a primary regulator valve to the second clutch;
a third proportional control solenoid valve for selectively supplying the line pressure supplied from the primary regulator valve to the first brake; and
a fourth proportional control solenoid valve for selectively supplying the forward pressure supplied from the manual valve to the second brake,
wherein bypass lines provided with a check valve are formed respectively at lines downstream of the first, second, third, and fourth proportional control solenoid valves.

14. A hydraulic control system of an automatic transmission for a hybrid vehicle which selectively operates first and second clutches and first and second brakes according to a plurality of driving modes, the hydraulic control system comprising:
a first proportional control solenoid valve for selectively supplying a forward pressure and a reverse pressure supplied from a manual valve to the first clutch;
a second proportional control solenoid valve for selectively supplying a line pressure supplied from a primary regulator valve to the second clutch;
a third proportional control solenoid valve for selectively supplying the line pressure supplied from the primary regulator valve to the first brake; and
a fourth proportional control solenoid valve for selectively supplying the forward pressure supplied from the manual valve to the second brake,
wherein the first and second proportional control solenoid valves are normal open types, and the third and fourth proportional control solenoid valves are normal cross types.

* * * * *